(12) United States Patent
Kazama

(10) Patent No.: US 7,517,156 B2
(45) Date of Patent: Apr. 14, 2009

(54) CRADLE BEARING

(75) Inventor: Sadatsune Kazama, Iwata (JP)

(73) Assignee: NTN Corporation, Osaka (JP)

( * ) Notice: Subject to any disclaimer, the term of this patent is extended or adjusted under 35 U.S.C. 154(b) by 329 days.

(21) Appl. No.: 11/512,364

(22) Filed: Aug. 30, 2006

(65) Prior Publication Data

US 2007/0053621 A1 Mar. 8, 2007

(30) Foreign Application Priority Data

Aug. 30, 2005 (JP) ............................. 2005-249724
Aug. 31, 2005 (JP) ............................. 2005-251938

(51) Int. Cl.
*F16C 32/00* (2006.01)
*F16C 33/58* (2006.01)

(52) U.S. Cl. ........................... 384/569; 384/2; 384/451; 92/12.2

(58) Field of Classification Search ........... 384/2, 384/51, 440, 451, 548–550, 576–576; 74/60; 92/12.2, 505–506; 417/227, 269
See application file for complete search history.

(56) References Cited

U.S. PATENT DOCUMENTS

| | | | | |
|---|---|---|---|---|
| 4,029,367 A | * | 6/1977 | Schwede et al. ................ 384/2 |
| 4,314,732 A | * | 2/1982 | Murphy ....................... 384/440 |
| 4,627,330 A | * | 12/1986 | Beck, Jr. ....................... 92/12.2 |
| 4,856,917 A | * | 8/1989 | Schroder et al. ............. 384/550 |
| 4,858,480 A | * | 8/1989 | Rohde et al. .................... 74/60 |
| 4,884,902 A | * | 12/1989 | Kispert et al. ................ 384/550 |
| 5,383,391 A | * | 1/1995 | Goade et al. .................. 92/12.2 |
| 5,390,584 A | * | 2/1995 | Fritz et al. ..................... 92/12.2 |
| 5,515,768 A | * | 5/1996 | Fritz et al. ...................... 91/505 |
| 5,630,352 A | * | 5/1997 | Todd ........................... 92/12.2 |
| 6,027,250 A | * | 2/2000 | Reubelt et al. .................. 384/2 |
| 6,676,294 B2 | * | 1/2004 | Harimoto et al. ............ 384/569 |
| 6,719,460 B1 | * | 4/2004 | Becker et al. ................ 384/550 |

FOREIGN PATENT DOCUMENTS

| | | | | |
|---|---|---|---|---|
| JP | | 200261643 A | * | 2/2002 |
| JP | | 2002-286041 | | 10/2002 |
| JP | | 2002349555 A | * | 12/2002 |

* cited by examiner

*Primary Examiner*—Marcus Charles
(74) *Attorney, Agent, or Firm*—Clark & Brody

(57) ABSTRACT

A cradle bearing comprises a circular arcuate outer race arranged in a circular arcuate recessed part provided in a housing, a plurality of rollers arranged along the inner circumferential surface of the outer race and supporting a swash plate swingably, and a retainer for retaining the interval between the rollers. An engagement member and the end face of the retainer in the circumferential direction are in face-to-face contact with each other.

6 Claims, 13 Drawing Sheets

CRADLE BEARING

BACKGROUND OF THE INVENTION

1. Field of the Invention

The present invention relates to a cradle bearing that supports a swash plate and the like swingably.

2. Description of the Background Art

Conventionally, a cradle bearing is used as a bearing that supports a swash plate of a swash plate plunger pump as shown in Japanese Unexamined Patent No. 2002-286041. According to the swash plate plunger pump, as shown in FIG. 13, a swash plate 6 is arranged in a circular arcuate recessed part 5a provided in a housing 5 through a cradle bearing 1.

According to this swash plate plunger pump, when the swash plate 6 oscillates, a plunger 7 arranged on a flat surface 6a of the swash plate 6 moves vertically to inhale and feed oil with pressure. In addition, in order to limit the oscillation range of the swash plate 6 within a constant range, the swash plate 6 and the housing 5 are connected through an oscillation amount control member 8.

The cradle bearing 1 used in such swash plate plunger pump comprises a outer race 2 arranged in the circular arcuate recessed part 5a, a plurality of rollers 3 arranged along the inner circumferential surface of the outer race 2 to support the swash plate 6 swingably, and a retainer 4 having pockets for retaining the plurality of rollers 3. In addition, the outer race 2 comprises a positioning projection 2a to engage with a positioning hole 5b of the housing 5 in order to be fixed in the circular arcuate recessed part 5a.

As shown in FIG. 14, the retainer 4 comprises a pair of circular arcuate members 4a and 4b along the outer race 2, and a plurality of pillar members 4c arranged between the pair of circular arcuate members 4a and 4b. The oscillation amount control member 8 penetrates through the retainer 4 so that the oscillation amount of the retainer 4 is controlled similar to the swash plate 6. In addition, as another means for controlling the oscillation amount of the retainer 4, there is a cradle bearing comprising engagement members provided at both ends of the outer race 2.

In addition, in order to avoid the interference between the pillar member 4c and the swash plate 6, the end face of the pillar member 4c has a contact end face 4d that abuts on the circular arcuate member 4a and a non-contact end face 4e that retreats from the contact end face 4d toward the center side and does not abut on the circular arcuate member 4a. Furthermore, the pocket for housing the roller 3 is formed between the adjacent pillar members 4c.

The retainer 4 having the above constitution is manufactured by injection molding with a resin material in general, and the stepped part formed between the contact end face 4d and the non-contact end face 4e has a linear configuration as shown in FIG. 15.

Since the outer race 2 having the engagement members at both ends is manufactured by pressing a steel plate in general, the root part of the engagement member 2b that is in contact with a track surface has an R-configuration, that is, a circular arcuate configuration.

Meanwhile, the retainer 4 is manufactured by injection molding with the resin material in general. The corner of the end face of the retainer in the circumferential direction is sharp-pointed because of a problem in cost for processing a conventional injection mold.

Thus, as shown in FIG. 16, the corner of the retainer 4 on the outer side in the diameter direction and the curved root part of the engagement member 2b are linearly in contact with each other, so that stress is concentrated on the contact part.

As a result, the retainer 4 could be damaged because it is formed of the resin and has low strength as compared with the engagement member 2b formed of metal.

In addition, according to the cradle bearing 1 having the above constitution, when the swash plate 6 oscillates, the roller 3 rotates around the roller center (refer to as the "rotating motion" hereinafter), and it moves along the track surface of the outer race 2 (referred to as the "revolving motion" hereinafter), and the retainer 4 also moves together with the roller 3.

However, since the range of motion of the retainer 4 is controlled by the engagement members 2b provided at both ends of the outer race 2, when the swash plate 6 oscillates beyond the range of motion of the retainer 4, the pillar member 4c of the retainer 4 hinders the revolving motion of the roller 3. This occurs prominently in a type of bearing that controls the oscillation amount of the retainer 4 by the engagement members provided at both ends of the outer race 2.

At this time, the pillar member 4c receives large load from the roller 3, so that the stress is concentrated on the stepped part 4f, which could cause the retainer 4 to be damaged.

SUMMARY OF THE INVENTION

It is an object of the present invention to provide a cradle bearing in which the contact surface pressure between an engagement member and a retainer is reduced and the retainer is prevented from being damaged.

A cradle bearing according to the present invention comprises a circular arcuate outer race, a plurality of rollers arranged along the inner circumferential surface of the outer race, and a retainer having pockets for housing the plurality of rollers. The outer race has an engagement member projecting from its end in the circumferential direction toward the inner side in the diameter direction, and the engagement member and the end face of the retainer in the circumferential direction are in face-to-face contact with each other. More specifically, the end face of the retainer in the circumferential direction preferably has a chamfered part on the outer side in the diameter direction.

According to the above constitution, since the corner of the retainer on the outer side in the diameter direction and the curved surface at the root of the engagement member are not in contact with each other but flat surfaces are in contact with each other, the contact surface pressure between the engagement member and the retainer can be reduced. As a result, the cradle bearing can effectively prevent the damage of the retainer due to the stress concentration.

Preferably, the engagement member is inclined inward by 0° to 5° from a line perpendicular to a tangent line at the end of the outer race in the circumferential direction. Thus, since the retainer is in contact with a flat part close to the tip end of the engagement member, the contact with the curved surface of the root of the engagement member can be avoided.

Preferably, the length "t" of the engagement member in the width direction and the length "L" of the roller has a relation such that $t/L \geq 0.7$. Thus, since the contact area between the retainer and the engagement member is increased, the contact surface pressure can be further reduced.

Further preferably, the outer race is formed by press working. In addition, further preferably, the retainer is formed of a resin material. Since the above press working method is suitable for manufacturing many lots, in which configuration freedom is high, the cradle bearing can be manufactured at low cost.

According to the present invention, the cradle bearing can prevent the retainer from being damaged by reducing the contact surface pressure between the retainer and the engagement member.

It is another object of the present invention to provide a cradle bearing in which stress concentration at a stepped part provided at a pillar member of a retainer is alleviated and the retainer is prevented from being damaged.

A cradle bearing according to the present invention comprises a circular arcuate outer race, a plurality of rollers arranged along the inner circumferential surface of the outer race, and a retainer comprising a pair of circular arcuate members and a plurality of pillar members arranged between the pair of circular arcuate members and having pockets provided between the adjacent pillar members to house the plurality of rollers. The end face of the pillar member has a contact end face abutting on the circular arcuate member, and a non-contact end face retreating from the contact end face so as not to abut on the circular arcuate member, and the stepped part formed between the contact end face and the non-contact end face has a curved surface.

According to the above constitution, since the stress concentration generated at the stepped part formed between the contact face and the non-contact face can be alleviated, even when the swash plate oscillates beyond the motion range of the retainer, the cradle bearing can prevent the retainer from being damaged.

Preferably, the retainer is formed of a resin material. When the retainer is manufactured by injection molding with the resin material, the stepped part has a linear configuration. In addition, since the resin material is low in hardness as compared with the outer race or the roller, the retainer is highly likely to be damaged due to the stress concentration. Thus, when the retainer formed of the resin has the above constitution, more preferable effect to prevent the damage of the retainer can be provided.

According to the present invention, the cradle bearing can prevent the retainer from being damaged by alleviating the stress concentration generated at the stepped part of the retainer.

DESCRIPTION OF THE PREFERRED EMBODIMENTS

Figure 2:
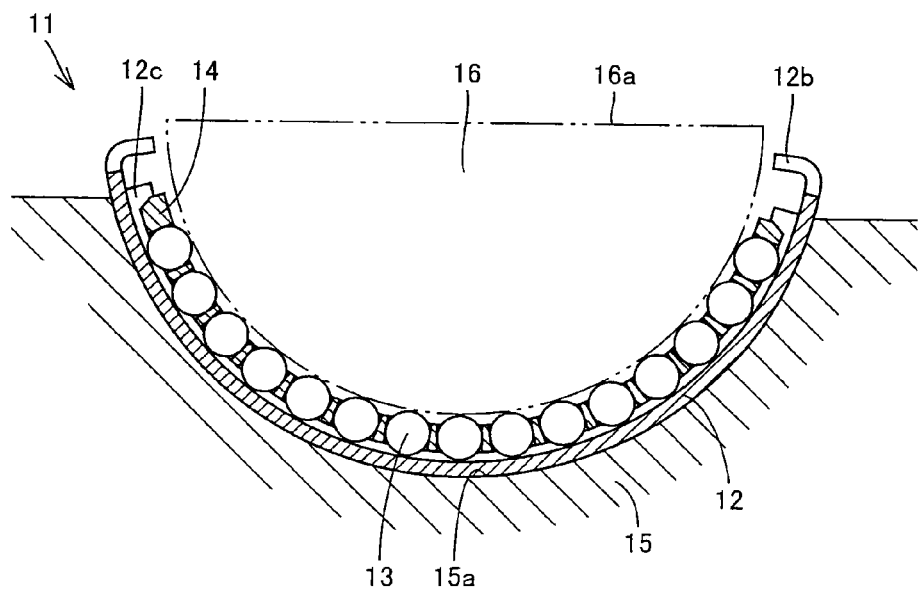
FIG. 2 is a view showing the whole cradle bearing according to one embodiment of the present invention.

A cradle bearing 11 according to one embodiment of the present invention will be described with reference to FIG. 2.

The cradle bearing 11 comprises a circular arcuate outer race 12 arranged in a circular arcuate recessed part 15a provided in a housing 15, a plurality of rollers arranged along the inner circumferential surface of the outer race 12 to support a swash plate 16 swingably, and a retainer 14 for retaining intervals between the plurality of rollers.

Figure 3A:
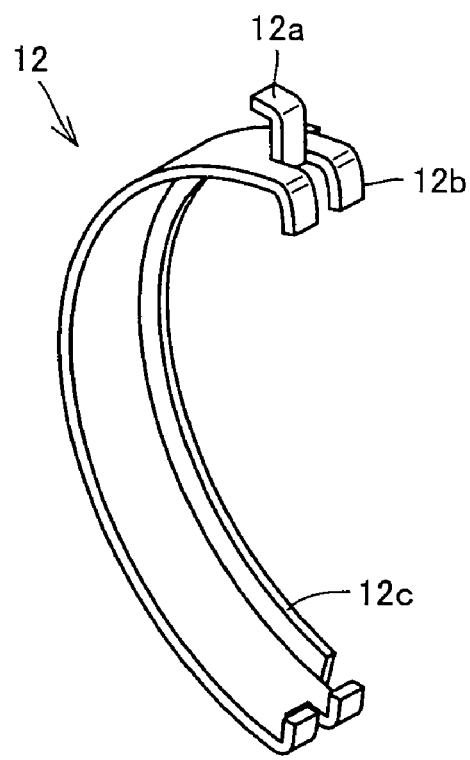
FIG. 3A is a view showing a outer race shown in FIG. 2, in which an engagement member is provided at an end in the circumferential direction.
Figure 3B:
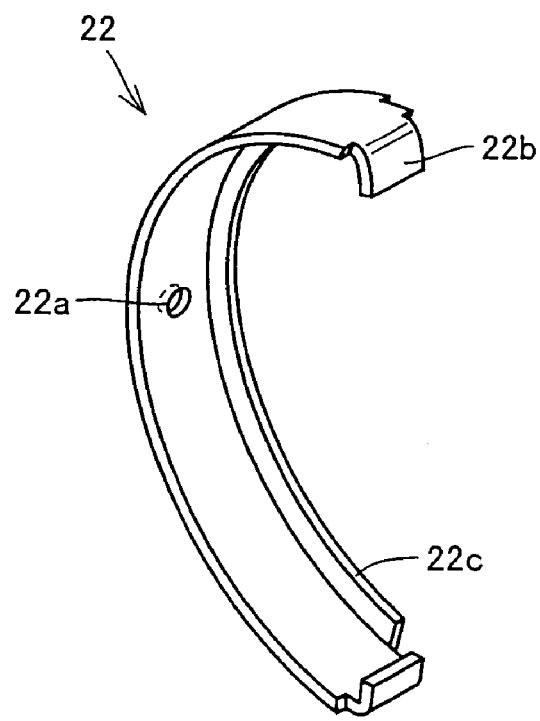
FIG. 3B is a view showing a outer race shown in FIG. 2, in which a positioning projection is provided on the outer circumferential surface.

The outer race 12 is manufactured by pressing a steel plate and in order to be fixed in the circular arcuate recessed part 15a, it comprises a positioning member 12a at its end in the circumferential direction to engage with a positioning hole 15b of the housing 15, and an engagement member 12b for controlling the oscillation amount of the retainer 14 in the circumferential direction as shown in FIG. 3A. In addition, as another meaning for fixing the position of the outer race, a positioning projection 22a may be provided on a outer circumferential surface as shown in FIG. 3B. In this case, the positioning hole of the housing is provided at the position corresponding to the positioning projection 22a.

Figure 4A:
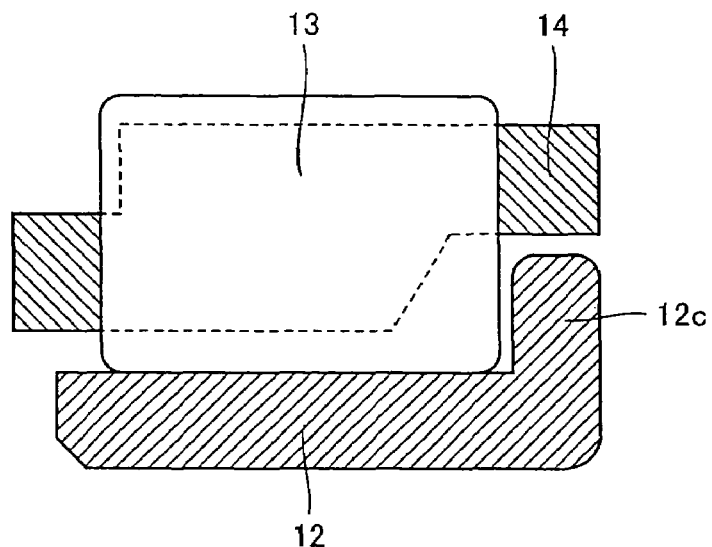
FIG. 4A is a sectional view showing the cradle bearing in FIG. 2, in which a flange is provided at one side in the width direction.
Figure 4B:
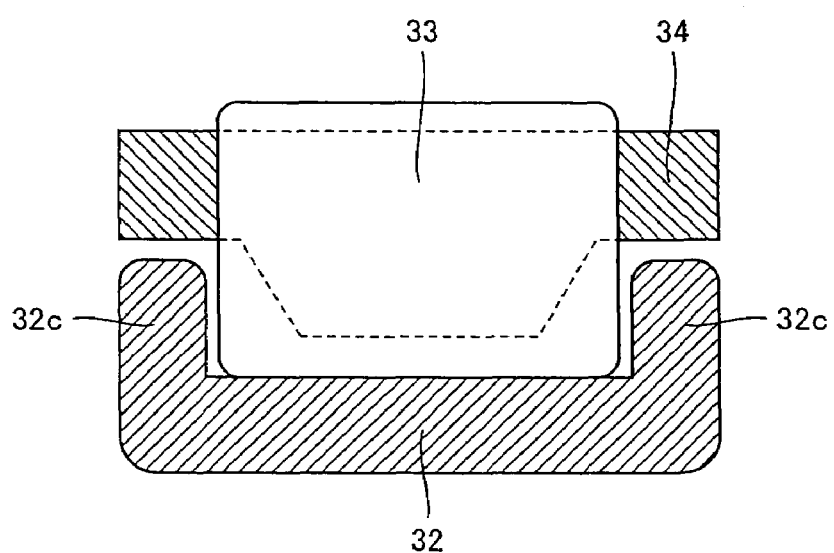
FIG. 4B is a sectional view showing the cradle bearing in FIG. 2, in which flanges are provided at both ends in the width direction.

In addition, in order to guide the end face of the roller 13, a flange 12c may be provided on one side of the outer race 12 in the width direction as shown in FIG. 4A, or flanges 32c may be provided on both sides of the outer race 32 in the width direction as shown in FIG. 4B. At this time, the retainer 14 or 34 comprises an escape part on one side or both sides of the end in the width direction so as not to interfere with the flange 12c or 32c.

The retainer 14 has a circular arcuate configuration along the outer race 12 and has pockets for housing the plurality of rollers, and it is manufactured by injection molding with a resin material. Furthermore, the corner of an end face in the circumferential direction on the outer side in the diameter direction that is in contact with the engagement member 12b of the outer race 12 is chamfered. The chamfered part may be C-chamfering as shown in FIG. 1 or may be R-chamfering as shown in FIG. 5.

Figure 1:
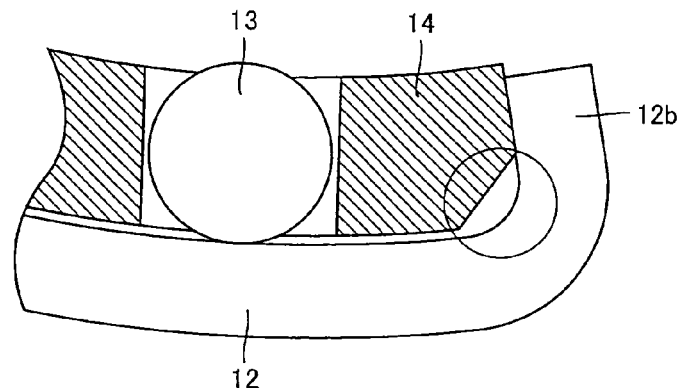
FIG. 1 is a partially enlarged view showing the end of a cradle bearing in the circumferential direction according to one embodiment of the present invention.

When the corner of the retainer 14 is linearly cut as shown in FIG. 1, the chamfered part has to be large enough so that the boundary between a flat part and the chamfered part may not interfere with the curved surface of the root part of the engagement member 12b. Thus, the retainer 14 is prevented from coming in contact with the root part of the engagement member 12b, so that the flat surfaces of the engagement member 12b and the end face of the retainer 14 in the circumferential direction can be in face-to-face contact with each other.

Figure 5:
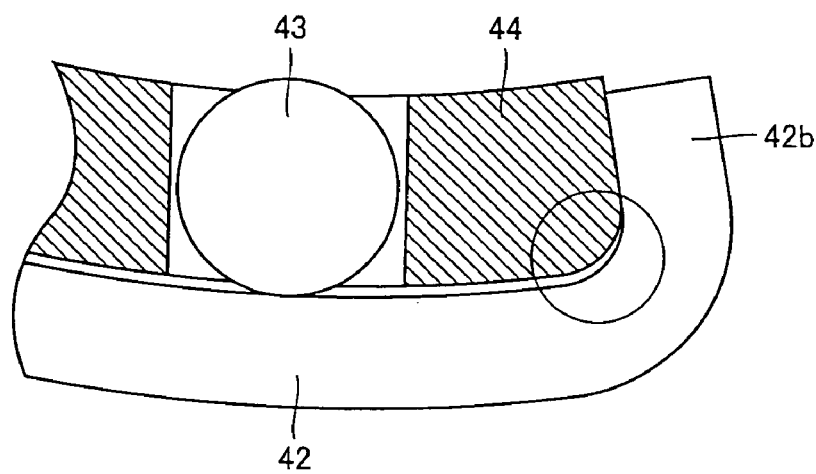
FIG. 5 is a view showing another example of a chamfered configuration of the end face of a retainer in the circumferential direction used in FIG. 1.

Meanwhile, as shown in FIG. 5, when the corner of a retainer 44 is R-chamfered, by setting the curvature of the retainer 44 so as to be equal to that of the root part of an engagement member 42b, since each of the flat surfaces, and the curved surfaces of both members are in face-to-face contact with each other, a contact area can be increased.

In either case, the contact surface pressure at the contact part can be reduced, so that the cradle bearing 11 can prevent the retainer 14 from being damaged due to stress concentration.

Figure 6:
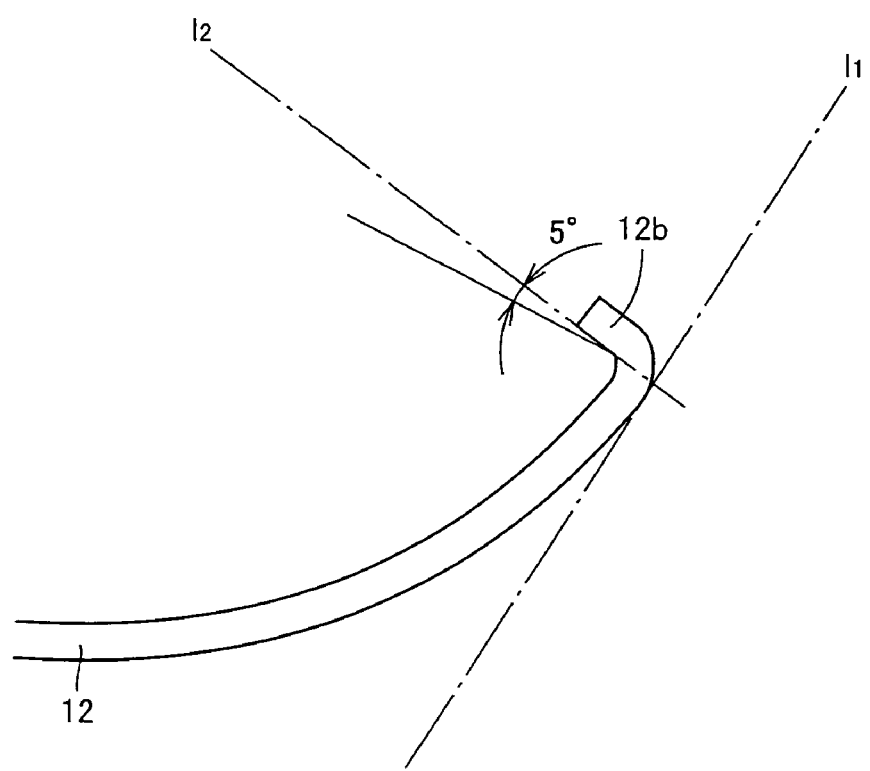
FIG. 6 is a view showing inclination of the engagement member with respect to the outer race.

In addition, as shown in FIG. 6, the engagement member 12b is inclined inward by 0° to 5° from a line $l_2$ that is perpendicular to a tangent line $l_1$ at the end of the outer race 12 in the circumferential direction. Thus, since the retainer 14 is in contact with the flat part close to the tip end of the engagement member 12b, the retainer 14 can be effectively prevented from coming into contact with the curved surface of the root part of the engagement member 12b. In addition, although the corner of the retainer 14 on the inner side in the diameter direction could be in contact with it depending on the inclined angle of the engagement member 12b, since the retainer 14 is formed of the resin and can be deformed to some extent, as long as the contact angle with the outer race 12 is in the above range, the retainer 14 is not damaged but deformed to be in face-to-face contact with it.

Another method to reduce the contact surface pressure between the retainer 14 and the engagement member 12b will be described with reference to FIGS. 7A, 7B, 8A and 8B.

Figure 7A:
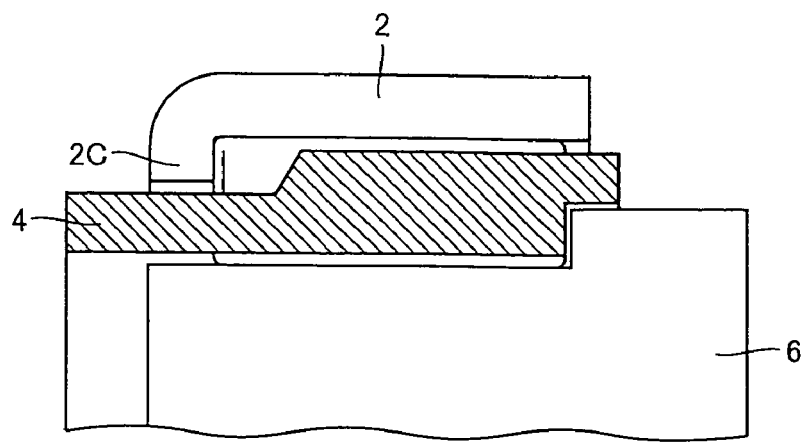
FIG. 7A is a view showing a sectional area of the retainer in the circumferential direction used in a conventional cradle bearing.
Figure 7B:
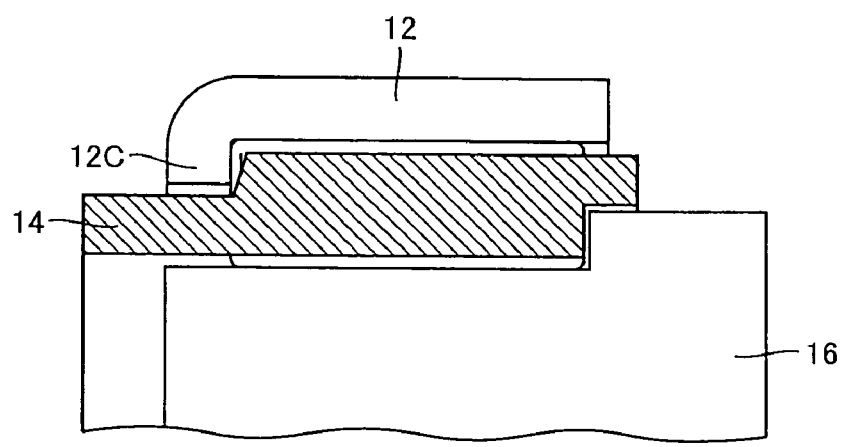
FIG. 7B is a view showing a sectional area of the retainer in the circumferential direction used in the cradle bearing according to one embodiment of the present invention.

FIGS. 7A and 7B are views each showing the section of the retainer in the circumferential direction. The retainer 14 according to one embodiment of the present invention shown in FIG. 7B is large in sectional area as compared with the conventional retainer 4 shown in FIG. 7A.

Figure 8A:
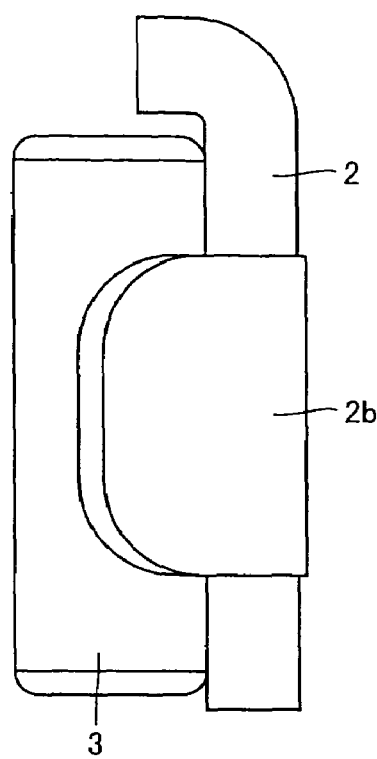
FIG. 8A is a view showing comparison in size between an engagement member and a roller in the conventional cradle bearing.
Figure 8B:
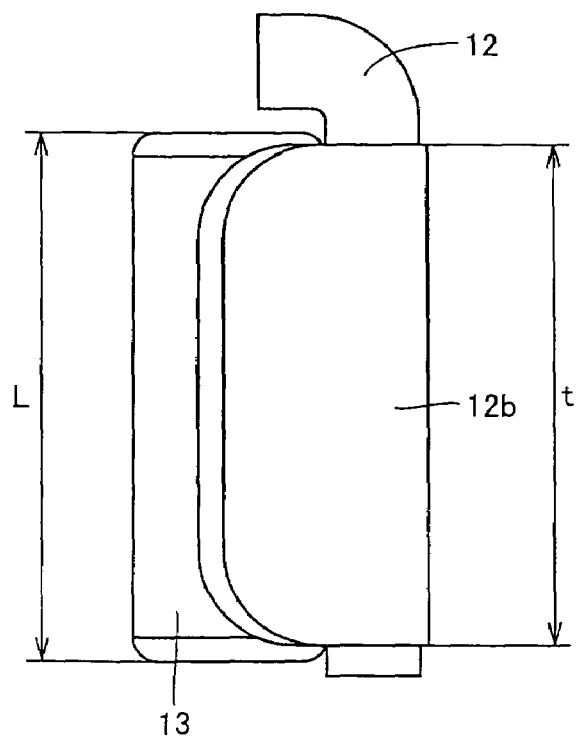
FIG. 8B is a view showing comparison in size between the engagement member and the roller in the cradle bearing according to one embodiment of the present invention.

Meanwhile, FIGS. 8A and 8B are views each showing the section of the engagement member of the outer race. The engagement member 12b according to one embodiment of the present invention shown in FIG. 8B is large in sectional area as compared with the conventional engagement member 2b shown in FIG. 8A.

Thus, when the contact area between the retainer 14 and the engagement member 12b is increased, the contact surface pressure can be reduced and the retainer 14 can be prevented from being damaged due to stress concentration.

Here, as shown in FIG. 8B, by setting the size of the engagement member 12 such that the length "t" of the engagement member 12b in the width direction and the length "L" of the roller may satisfy that $t/L \geq 0.7$, it is considered that the retainer 14 can be prevented from being damaged due to the stress concentration.

A cradle bearing 111 according to another embodiment of the present invention will be described with reference to FIGS. 10A and 10B.

Figure 10A:
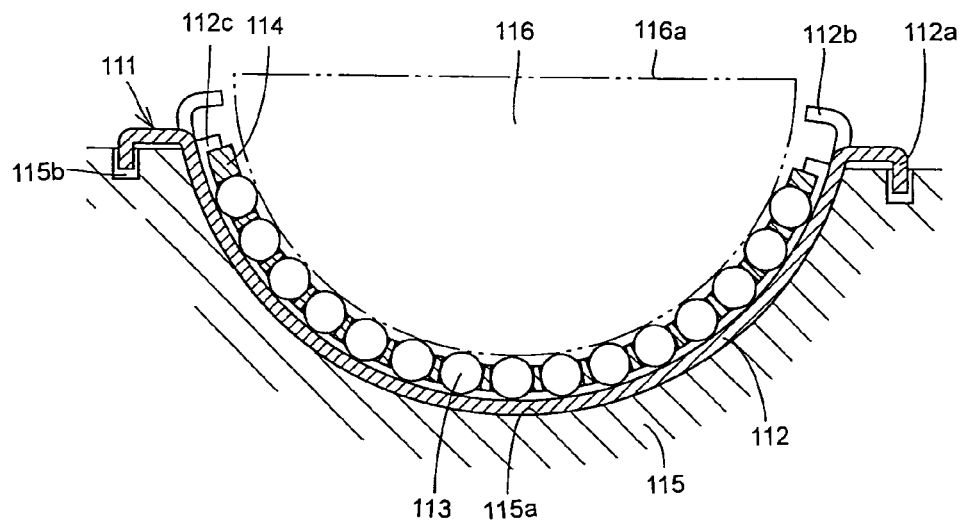
FIG. 10A is a sectional view showing the cradle bearing according to one embodiment of the present invention.

As shown in FIG. 10A, the cradle bearing 111 comprises a circular arcuate outer race 112 arranged in a circular arcuate recessed part 115a provided in a housing 115, a plurality of rollers 113 arranged along the inner circumferential surface of the outer race 112 to support a swash plate 116 swingably, and a retainer 114 for retaining intervals between the plurality of rollers 113.

Figure 10B:
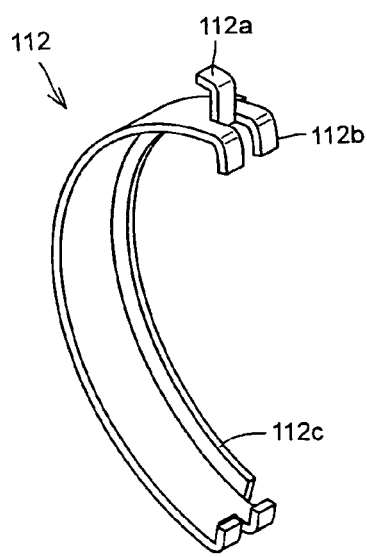
FIG. 10B is a perspective view showing the outer race of the cradle bearing according to one embodiment of the present invention.

As shown in FIG. 10B, the outer race 112 comprises a positioning member 112a at its end in the circumferential direction to engage with a positioning hole 115b of the housing 115 in order to be fixed in the circular arcuate recessed part 115a, an engagement member 112b for controlling the oscillation amount of the retainer 114 in the circumferential direction, and a flange 112c provided on one side of the outer race 112 in the width direction to guide the end face of the roller 113, and it is manufactured by pressing a steel plate.

Figure 11:
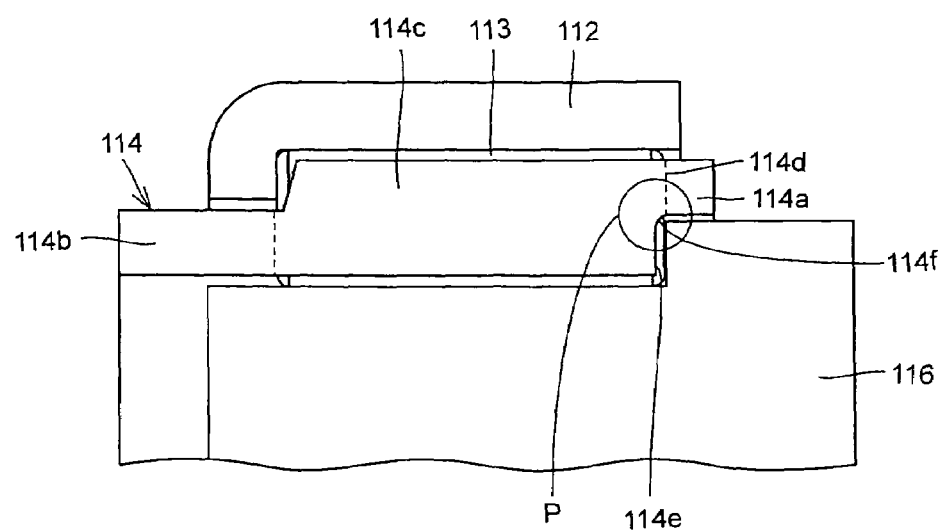
FIG. 11 is a sectional view showing the end face of a retainer in the circumferential direction used in FIG. 10A.

As shown in FIG. 11, the retainer 114 comprises a pair of circular arcuate members 114a and 114b along the outer race 112, a plurality of pillar members 114c provided between the pair of circular arcuate members 114a and 114b, and a pocket for housing the roller 113 is formed between the adjacent pillar members 114c. The retainer 114 is manufactured by injection molding with a resin material.

Figure 9A:
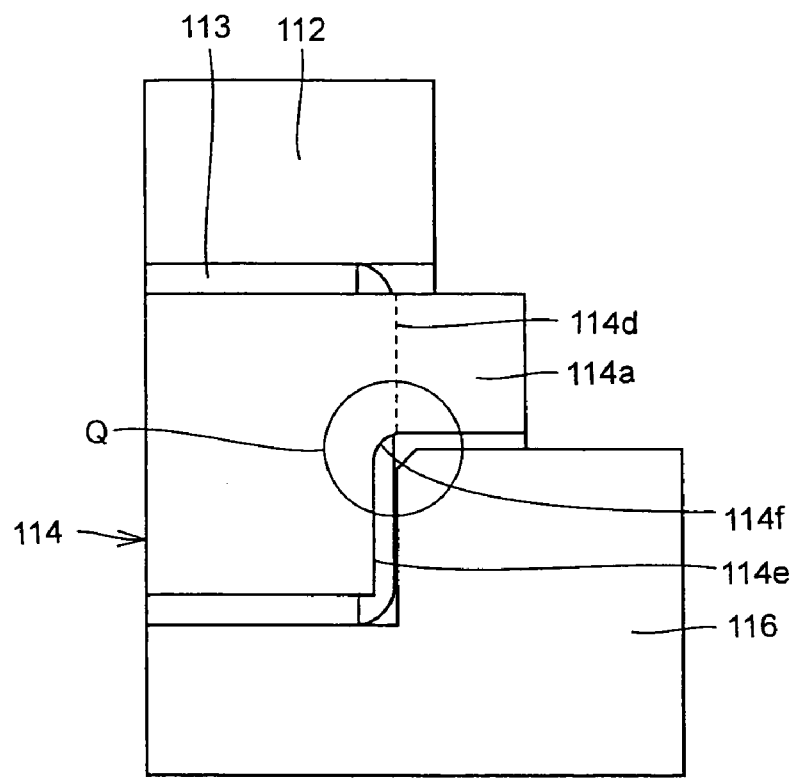
FIG. 9A is a partially enlarged view showing the cradle bearing according to one embodiment of the present invention for a part "P" in FIG. 11.
Figure 9B:
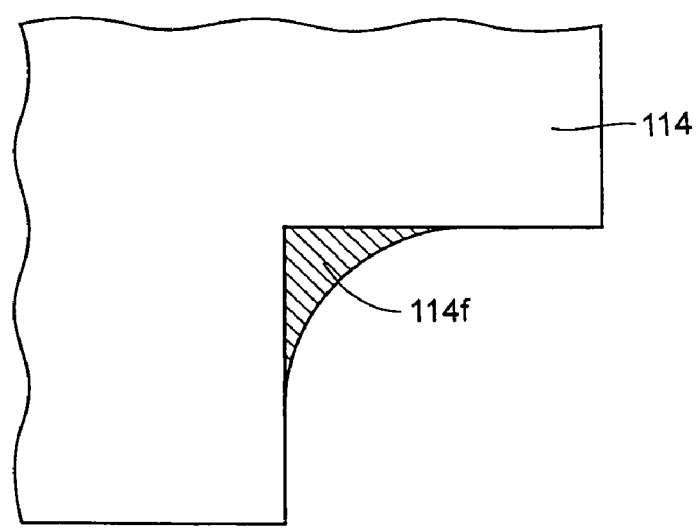
FIG. 9B is an enlarged view of a part "Q" in FIG. 9A.

In addition, in order to avoid the interference between the pillar member 114c and the swash plate 116, the end face of the pillar member 114c has a contact end face 114d that abuts on the circular arcuate member 114a and a non-contact end face 114e that retreats from the contact end face 114d toward the center side and does not abut on the circular arcuate member 114a. Furthermore, as shown in FIGS. 9A and 9B, the stepped part formed between the contact end face 114d and the non-contact end face 114e is a curved surface.

According to the retainer 114 having the above configuration, since the stepped part 114f is the curved surface, stress concentration generated at the stepped part 114f can be alleviated. As a result, even when the swash plate 116 oscillates beyond the range of motion of the retainer 114 and the pillar member 114c of the retainer 114 hinders the rotation of the roller 113, the retainer 114 can be effectively prevented from being damaged by load applied from the roller 113.

Figure 12A:
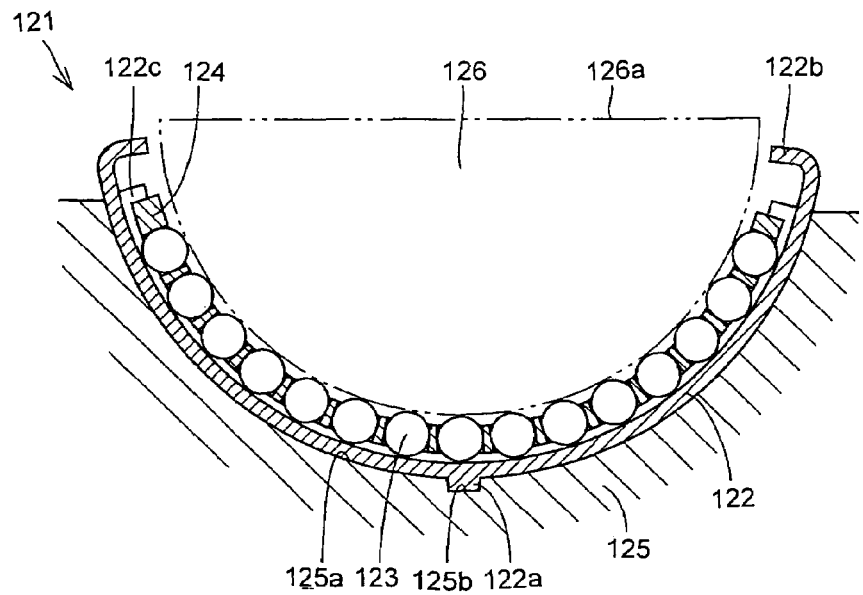
FIG. 12A is a sectional view showing a cradle bearing according to another embodiment of the present invention.
Figure 12B:
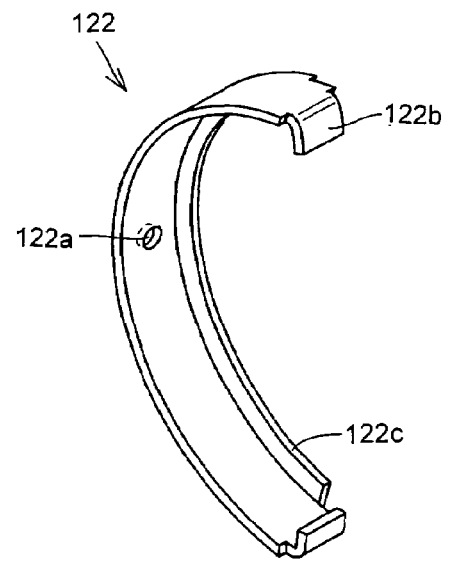
FIG. 12B is a perspective view showing a outer race of the cradle bearing according to another embodiment of the present invention.
Figure 13:
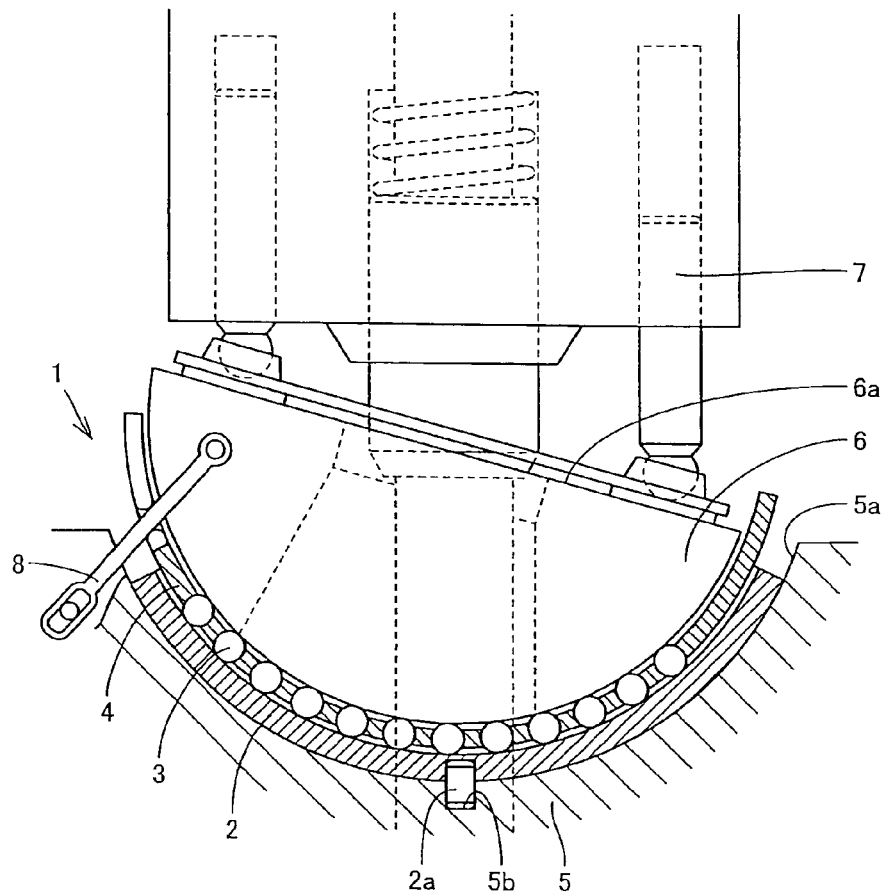
FIG. 13 is a view showing a conventional cradle retainer.
Figure 14:
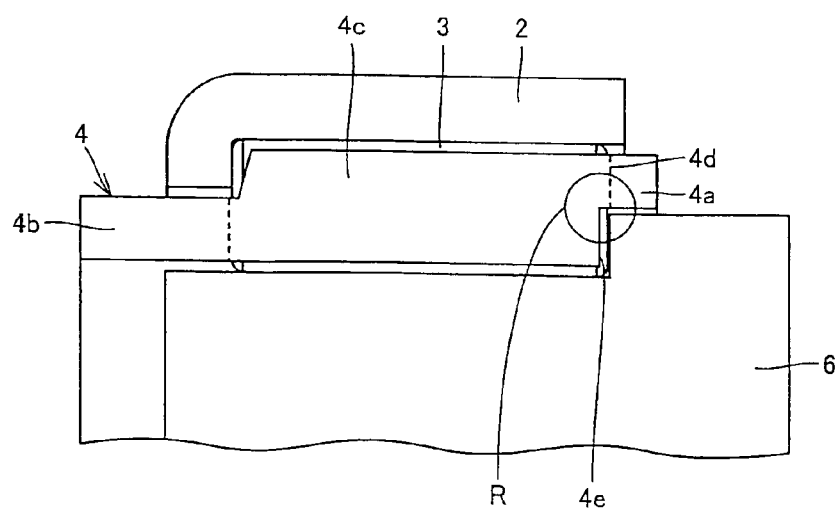
FIG. 14 is a sectional view showing the end face of the retainer in the circumferential direction used in FIG. 13.
Figure 15:
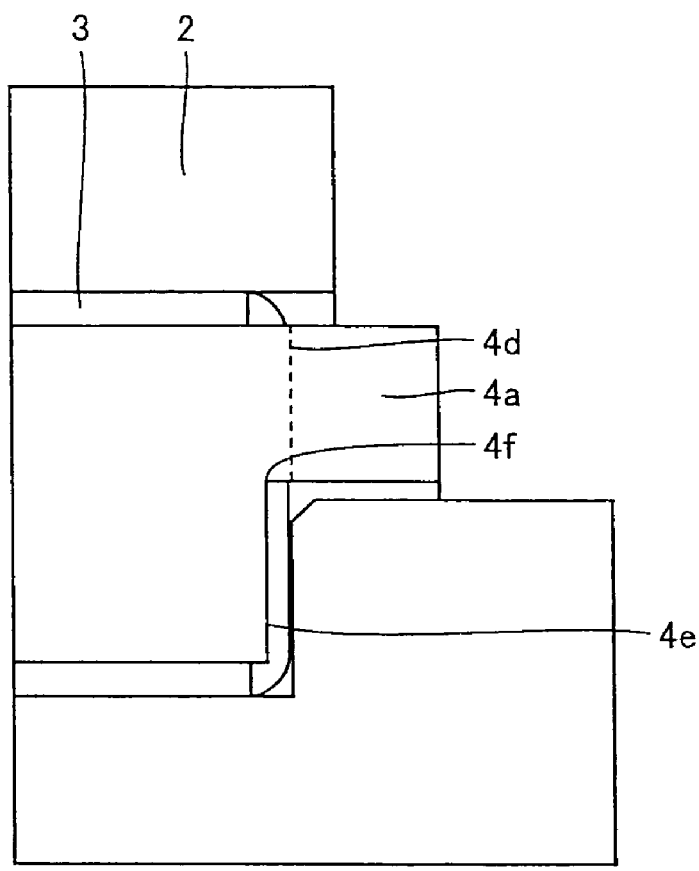
FIG. 15 is an enlarged view showing a part "R" in FIG. 14.
Figure 16:
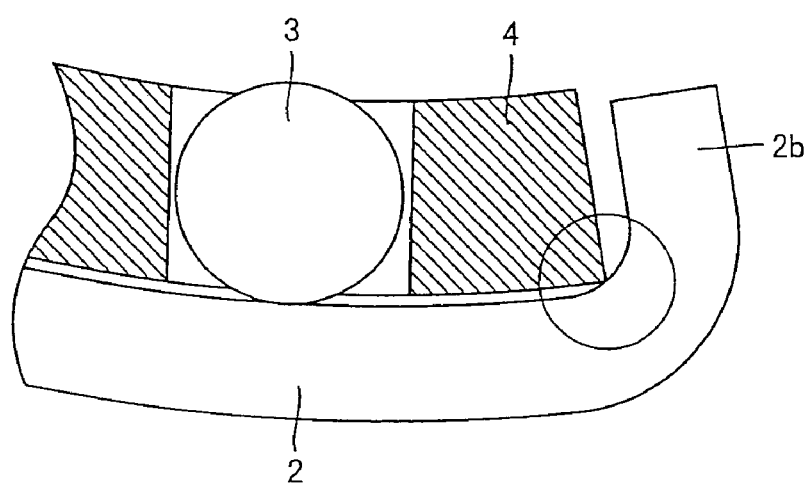
FIG. 16 is a partially enlarged view showing the contact part between the retainer and an engagement member in FIG. 13.

In addition, although the cradle bearing 111 comprises the positioning member 112a at the end of the outer race 112 in the circumferential direction to be fixed in the circular arcuate recessed part 115a in the above embodiment, the present invention is not limited to this. For example, a positioning projection 122a may be provided on the outer circumferential surface of a cradle bearing 121 as shown in FIGS. 12A and 12B. In this case, a positioning hole 125b of a housing is provided at the position corresponding to the positioning projection 122a. In addition, since the basic constitution of the cradle bearing 121 is the same as that of the cradle bearing 111, its description will be omitted.

Furthermore, although the present invention can be applied to various kinds of retainers used in the cradle bearing 111, when the present invention is applied to the retainer 114 that is formed of the resin and manufactured by the injection molding as the manufacturing method by which the stepped part 114f is likely to have the linear configuration and its hardness is low as compared with the outer race 112 or the roller 113, an excellent effect to prevent the damage of the retainer 114 can be provided.

Although the cradle bearings 111 and 121 shown in FIGS. 9A to 12B may comprise the engagement member projecting from the end of the outer race in the circumferential direction toward the inner side in the diameter direction to control the oscillation amount of the retainer and the engagement member and the end of the retainer in the circumferential direction may be in face-to-face contact with each other similar to the cradle bearing 11 shown in FIGS. 1 to 8B, a detailed description for it will be omitted.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

The present invention can be advantageously applied to the cradle bearing that supports the swash plate and the like swingably.

What is claimed is:

1. A cradle bearing comprising:
   a circular arcuate outer race;
   a plurality of rollers arranged along the inner circumferential surface of said outer race; and
   a retainer having pockets for housing said plurality of rollers, wherein
   said outer race has an engagement member projecting from its end in the circumferential direction toward the inner side in the diameter direction, and
   said engagement member and the end face of said retainer in the circumferential direction are in face-to-face contact with each other, and
   further wherein the engagement member of the outer race has a flat inner surface, the flat inner surface of the engagement member and a track surface of the outer race being connected through a curved surface positioned therebetween, and
   an end portion of the retainer in the circumferential direction has a flat end face to be in contact with the flat inner surface of the engagement member, and a chamfered part to be in face-to-face contact with the curved surface of the outer race,
   an inner end and an outer end in the diameter direction of the chamfered part of the retainer are made in contact with the flat inner surface and the track surface of the outer race, respectively apart from the curved surface of the outer race.

2. The cradle bearing according to claim 1, wherein said engagement member is inclined inward by 0 to 5 from a line perpendicular to a tangent line at the end of said outer race in the circumferential direction.

3. The cradle bearing according to claim 1, wherein the length "t" of said engagement member in the width direction and the length "L" of said roller has a relation such that $t/L \geqq 0.7$.

4. The cradle bearing according to claim 1, wherein said outer race is formed by press working.

5. The cradle bearing according to claim 1, wherein
   said retainer comprises a pair of circular arcuate members and a plurality of pillar members arranged between the pair of circular arcuate members,
   the end face of said pillar member has a contact end face abutting on said circular arcuate member, and a non-contact end face retreating from said contact end face so as not to abut on said circular arcuate member, and
   the stepped part formed between said contact end face and said non-contact end face has a curved surface.

6. The cradle bearing according to claim 1, wherein said retainer is formed of a resin material.

* * * * *